United States Patent [19]

Wendt

[11] 4,225,926
[45] Sep. 30, 1980

[54] APPARATUS FOR LOADING AND UNLOADING AN AIRCRAFT AND ASCERTAINING THE WEIGHT OF THE LOAD

[75] Inventor: Hans J. Wendt, Buxtehude, Fed. Rep. of Germany

[73] Assignee: Messerschmitt-Boelkow-Blohm GmbH, Munich, Fed. Rep. of Germany

[21] Appl. No.: 2,062

[22] Filed: Jan. 9, 1979

[30] Foreign Application Priority Data

Jan. 18, 1978 [DE] Fed. Rep. of Germany ....... 2802003

[51] Int. Cl.² ............................................. G01M 1/12
[52] U.S. Cl. .................................. 364/463; 364/567; 73/65; 177/136
[58] Field of Search .................. 364/463, 567; 177/25, 177/26, 136; 73/65

[56] References Cited

U.S. PATENT DOCUMENTS

| | | | |
|---|---|---|---|
| 3,415,979 | 12/1968 | Bussell et al. | 364/567 X |
| 3,513,300 | 5/1970 | Elfenbein et al. | 364/567 X |
| 3,584,503 | 6/1971 | Senour | 73/65 |
| 3,588,480 | 6/1971 | Unger et al. | 364/567 X |
| 3,701,279 | 10/1972 | Harris et al. | 177/136 X |
| 3,746,844 | 7/1973 | Szum et al. | 364/463 |
| 3,917,937 | 11/1975 | Sten | 73/65 X |
| 4,110,605 | 8/1978 | Miller | 73/65 X |
| 4,137,567 | 1/1979 | Grube | 364/567 |

Primary Examiner—Edward J. Wise
Attorney, Agent, or Firm—W. G. Fasse; D. F. Gould

[57] ABSTRACT

The present apparatus is used for ascertaining the individual weight of any type of load including that of passengers and of hand baggage, that is added to the total payload of an aircraft. Each individual weight is ascertained and, if desired, displayed and added up to ascertain the total weight. For this purpose a weight sensing device such as a group of load cells or the like including a platform is arranged at the entrance to the freight or baggage compartment and, in a passenger aircraft at each passenger entrance door inside the aircraft. The weight sensing device provides an electrical signal for each weight unit that passes the platform into the aircraft. The weight representing electrical signal is supplied to an adder and to a display unit where the individual weights are displayed as well as the total weight. Further, control signals may be derived from the individual weight representing signals and control signals may be provided through a keyboard for energizing drive rollers or conveyors which transport a freight container or the like to a predetermined freight stall and for lashing the container down in its stall.

14 Claims, 14 Drawing Figures

Fig.14 LOWER HALF

Fig.14 UPPER HALF

APPARATUS FOR LOADING AND UNLOADING AN AIRCRAFT AND ASCERTAINING THE WEIGHT OF THE LOAD

BACKGROUND OF THE INVENTION

The present invention relates to an apparatus for loading and unloading an aircraft and for ascertaining the weight of the payload.

For an efficient operation of commercial aircraft such as passenger and/or freight aircraft, it is necessary for an optimal planning of any flight that the pilot receives a weight information that is as precise as possible with regard to the payload and also with regard to the load distribution within the aircraft. Such information makes it possible to determine the required fuel quantity for any particular flight much more precisely than is customary heretofore. If no exact data regarding the payload are available, it is necessary to load the aircraft with an additional fuel quantity for safety purposes. Under normal operating conditions such additional fuel quantity is not used up at the end of a flight. The carrying of additional fuel adds to the weight of the aircraft and hence, results in an increased fuel consumption which should be avoided.

It is customary to ascertain the total weight of the freight by weighing the individual freight containers and pallets by means of scales on the ground in an airport. However, such weighing on the ground has certain disadvantages. The weighing stations are not uniformly available at all airports. Further, the passenger weight is only approximated by multiplying an average passenger weight by the number of passengers on any particular flight. Such average weight is not very precise, especially where the average weight employed requires corrections. Besides, the total weight of hand baggage carried by the passengers may also be substantial.

Prior art freight loading and unloading systems have the advantage that they permit the conveying of the individual freight pieces such as containers, pallets, and so forth from the freight gate to the individual loading positions and in the reverse direction by means of roller drives or the like. However, such prior art power driven conveying devices do not provide the possibility of checking the weight of the freight that is being loaded into an aircraft or that has been removed from an aircraft. Thus, heretofore it has not been possible to avoid localized overloading of the freight space structure. It is, however, desirable, that the freight should be distributed substantially uniformly over the available loading space.

A known method of ascertaining the weight of the total payload in an aircraft measures the load that is effective on the landing gear, please see U.S. Pat. No. 3,584,503 issued June 15, 1971. In this method the load applied to each individual landing gear leg is ascertained by measuring a force and then determining the total weight of the aircraft from such measurements. The empty weight of the aircraft and the weight of the fuel is then deducted from the so ascertained total weight to obtain the payload. Such weight ascertaining systems are known as so-called weight and balance systems and are also capable of ascertaining the location of the center of gravity of the aircraft. However, the data representing the payloads are relatively not too precise because they have been ascertained through first measuring the total weight. Besides, such systems are not capable of providing any information regarding the weight of individual load items nor information regarding the weight distribution.

OBJECTS OF THE INVENTION

In view of the above it is the aim of the invention to achieve the following objects singly or in combination:

to provide an apparatus for the loading and unloading of an aircraft which is capable of ascertaining the weight of the load during the loading operation as precisely as possible including the total weight and the weight of individual load items as well as the weight distribution;

to increase the speed of the loading and unloading operation while simultaneously reducing the danger of accidents;

to indicate the position of the center of gravity of an aircraft as a result of the ascertained individual weights added to the payload of the aircraft;

to provide a warning signal showing if any local overloading of the freight space structure has occurred;

to provide precise data enabling the determination of the fuel quantity required for any particular flight; and to move the individual freight items with a speed controllable in such a manner that the loading or unloading speed may be adapted to the instantaneously prevailing conditions whereby the maximum speed may be higher than the presently prevailing conveyor speeds in the prior art.

SUMMARY OF THE INVENTION

According to the invention there is provided an apparatus for loading and unloading an aircraft and for ascertaining the weight of the load comprising weighing station means arranged in such positions in the aircraft that any weight to be added to the payload of the aircraft must operatively pass said weighing station means, load cell means in said weighing station means to provide weight representing electrical signals, electronic, logic circuit means, and conductor means operatively connecting said electronic logic circuit means to said load cell means for evaluating said weight representing electrical signals to provide respective control signals. In addition, the apparatus comprises conveying or transporting devices for the freight, arranged for cooperation with the weighing station means. Further, freight lashing mechanisms are provided on board the aircraft.

The weighing results are displayed on a display showing the weights of individual freight items as well as the total weight. The display of the individual freight items is arranged in such a manner that a graphical illustration of the freight space is combined with the individual display windows. Stated differently, each display window designates a particular freight position or stall in the freight space of the aircraft. All operating instructions which, for example, may be supplied through a keyboard, and all measured results are processed through a control logic circuit arrangement such as a microprocessor which supplies the necessary signals to the further components of the apparatus such as the display devices, the speed control for the conveyor means and the like.

The signals are processed in the form of digital signals and are transmitted by at least one carrier frequency. Thus, it is possible to realize all information transmitting paths by means of coaxial cables which may be simultaneously utilized to provide the power supply for the active components of the system.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
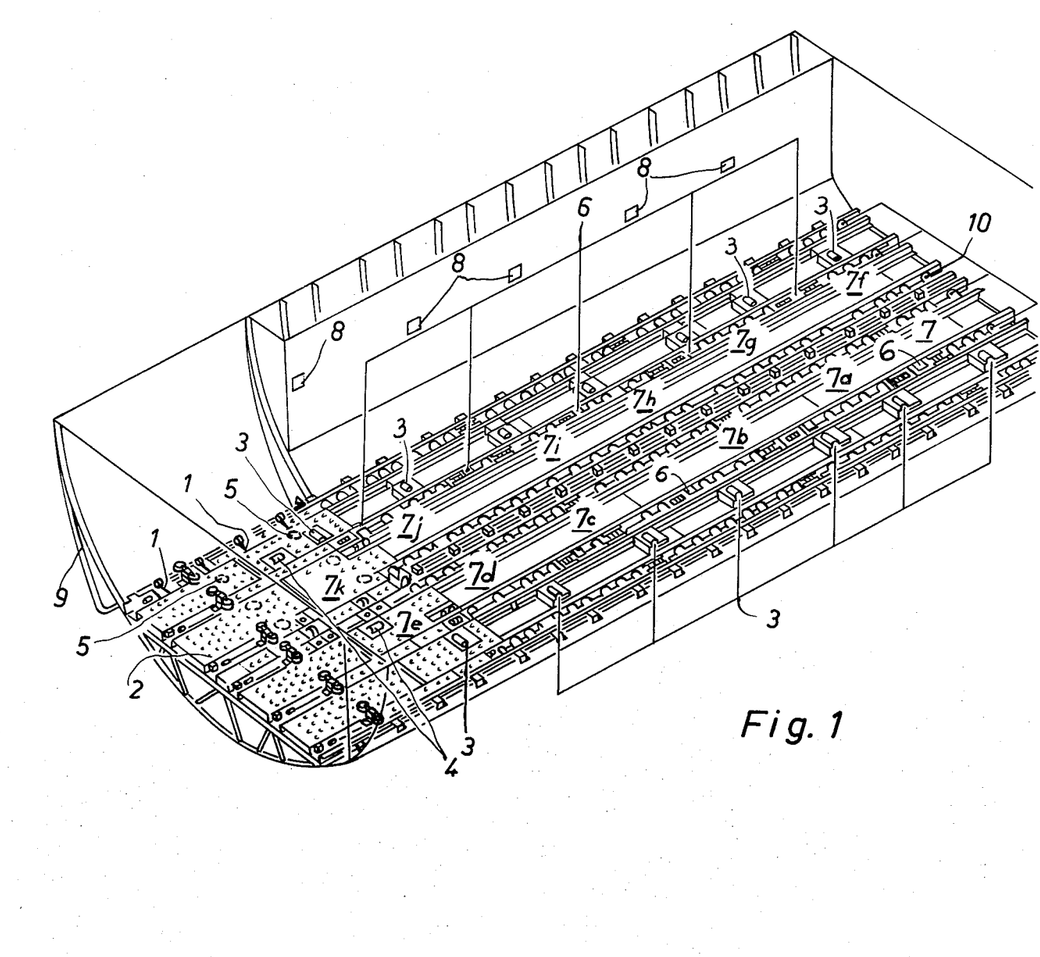
FIG. 1 is a perspective, yet somewhat schematic view of a freight space area inside an aircraft including means for loading and unloading the freight space in accordance with the invention.

FIG. 1 illustrates a somewhat schematic, perspective general view of the freight space in an aircraft incorporating an example embodiment of a system according to the invention for the loading and unloading of such aircraft. A door 9 lead into the freight compartment. Guide rails 1 near the gate or door 9 lead a freight container, not shown, onto a platform supported by weight sensors 5 to be described in more detail below. The platform with the weight sensors 5 may be covered by so-called ball bearing mats 2. Longitudinal drive rollers 3 extending across the width of the freight compartment are provided for transporting a freight container in the direction of the longitudinal axis of the freight compartment. Further, drive rollers 4 extending with their longitudinal axis in the direction of the longitudinal axis of the freight compartment are provided for moving a freight container or the like across the width of the freight compartment.

The freight compartment is divided into freight positions or stalls indicated as 7, 7a, 7b, 7c, through 7k. The just mentioned freight positions or stalls are located adjacent to longitudinal roller conveyors 10. Further longitudinal drive rollers 3 are located in the area of these freight positions. Each freight position is equipped with a freight lashing or latching mechanism 6 known as such and capable of securing, for example, a pallet or freight container to the loading floor of the freight compartment. Such lashing devices 6 may be installed recessed below the level of the freight floor or they may be installed on top of the freight floor as is well known in the art.

When loading, for example, a freight container into the freight compartment through the open door 9, the container is placed on the guide rails 1 and moved along such guide rails toward the ball bearing mat 2 until the rollers 4 contact the container and move it into the freight position 7k. When the container has taken up the position 7k the drive means are manually switched off by the operator and the weight of the container is ascertained by means of the weight sensors or load cells 5. Thereafter, again manually, the drive rollers 4 are switched on to move the container, for example into position 7e. Thereafter the longitudinal drive rollers 3 are switched on to move the container to position 7. Whereby the roller conveyor means 10 reduce the friction between the moving container and the freight floor. If the container has taken up its intended position, for example position 7, all drive means are switched off and the respective latching mechanism 6 is activated to secure the freight container in position. The latching mechanism may, for example, comprise magnetically operated hooks which engage respective recesses of the freight container as is well known in the art. When container positions 7 to 7e are fully occupied, the following containers will, in the same manner as described in the foregoing, be moved into their respective positions 7f to 7k. The last container is placed, for example, in position 7k and is latched in position in the same manner as all the other containers. The unloading takes place in the same manner only in the reverse, whereby the weighing step is omitted.

Figure 2:
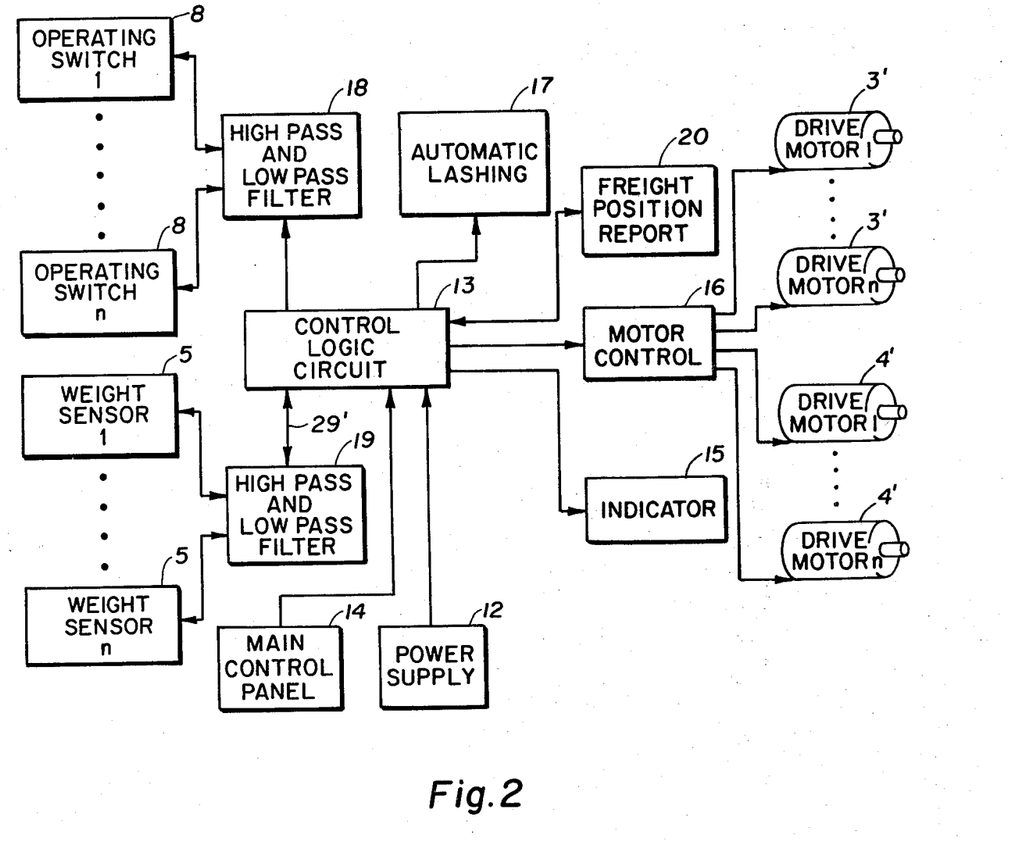
FIG. 2 is a block circuit diagram of the control system according to FIG. 1.

The activation and deactivation of the various drive means 3, 4 is accomplished by operating switches 8 for closing and opening respective drive energizing circuits for the motors 3', 4' shown in FIG. 2. The switches 8 are also shown in FIG. 2. The arrangement may be such that the respective motors are energized as long as an operator depresses the corresponding switch 8. These switches may be constructed as will be described in more detail below with reference to FIG. 8. By driving the motor 3', 4' only as long as the corresponding switch 8 is depressed and by locating the switches 8 at such a level, that only a standing operator can depress a switch 8, a safety feature is provided in that a container cannot roll over an operator who may have fallen by accident to the freight floor.

FIG. 2 illustrates a block circuit diagram of the electronic control apparatus according to the invention primarily comprising the above mentioned operating switch 8, corresponding high pass and low pass filter means shown in a common block 18, a main control panel 14, a control logic circuit 13 and a motor control 16 for activating the drive motor 3', 4', whereby the actuation of any of the switches 8 results in a control signal passed through the control logic circuit 13 and the motor control 16 of conventional construction. A display unit or indicator 15 is also connected to the control logic circuit 13 for indicating the ascertained weights of the individual freight items or of the individual passengers as well as for indicating the total weight as ascertained by the weight sensors 5 which are also operatively connected through respective high pass filter and low pass filter means 19 to the control logic circuit 13. A position or rather freight position report mechanism 20 is also connected to the logic circuit 13 for indicating which freight positions 7, 7a, 7b, 7c, through 7k have been filled. An automatic lashing mechanism 17 receives its control signal from the logic circuit 13 in response to respective input instructions from the operator through the main control panel 14 or in response to a signal received from the position report mechanism 20. A power supply unit 12 is connected to the logic circuit 13 and supplies all components of the system with the necessary power. For this purpose the main control panel 14, the weight sensors 5, the indicating unit 15, and the motor control unit 16 are operatively connected to the logic circuit 13 by means of coaxial cables which transmit the respective information or control signals by means of a modulated carrier frequency. These cables simultaneously supply the power necessary for operating the various active components of the system.

Figure 3:
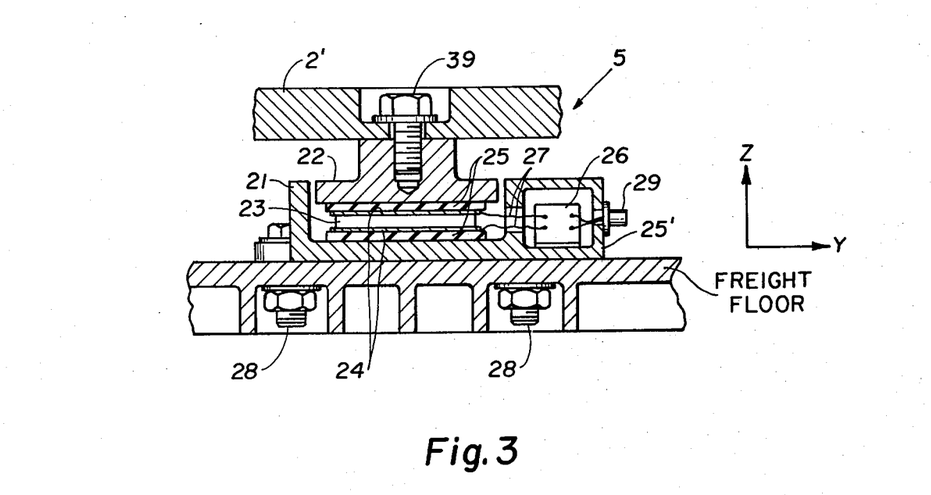
FIG. 3 is a sectional view through a weight sensor forming a load cell for the weighing system.

In operation, if a freight container is to be placed into the freight compartment of an aircraft, the operator first activates through a respective switch 8, the motors 4' for moving the container with the respective rollers 4 across the loading floor until the container takes up the desired position on the ball bearing mat 2 and/or platform 2' of the weight sensors 5 as shown in more detail in FIG. 3. In this position each container is weighed. In response to a corresponding initial instruction by the operator at the main control panel 14, the control logic circuit 13 interrogates each weight sensor 5 for transmission of any weight values ascertained by the sensors 5 through the logic circuit 13 to the indicator 15 to be described in more detail below with reference to FIG. 7. The indicator 15 permits reading off the individual container weight from a display field or position. Thereafter, the container is moved to a specific freight location 7, 7a, 7b, 7c, through 7k, as mentioned above. Each drive motor 3' corresponds to a respective operating switch 8 which may be numbered from 1 to "n" in the same manner as the corresponding motors. Each operating switch 8 may comprise a button for forward or reverse rotation of the respective drive roller and motor. In addition, each switch 8 comprises an address encoder which provides in addition to the forward or reverse rotation information, an address information of the motor to be energized. The address information corresponds to the respective location 7 to 7k and such address information is also supplied to the control logic circuit 13 through the respective filter means 18, whereby the control logic circuit 13 energizes the respective motor through the motor control circuit 16. When the container has reached the position which was designated by the actuation of the respective switch or button 8, the control circuit 13 switches the motor off and simultaneously the automatic lashing device 17 receives an instruction signal for lashing down the container in the position as designated by the initial actuation of the respective switch 8. Thus, the container remains lashed down by the respective lashing device 6 against any displacement during the flight and until loading.

Each loading position or stall 7, 7a and so forth comprises means for reporting the placement of a piece of freight in the respective position. These freight position report means 20 provide an occupied signal to the logic circuit 13, whereby the latter makes sure that a container which is presently being advanced cannot collide with a container already occupying a freight position or stall. The freight position report means will be described in more detail below with reference to FIG. 6.

Figure 4:
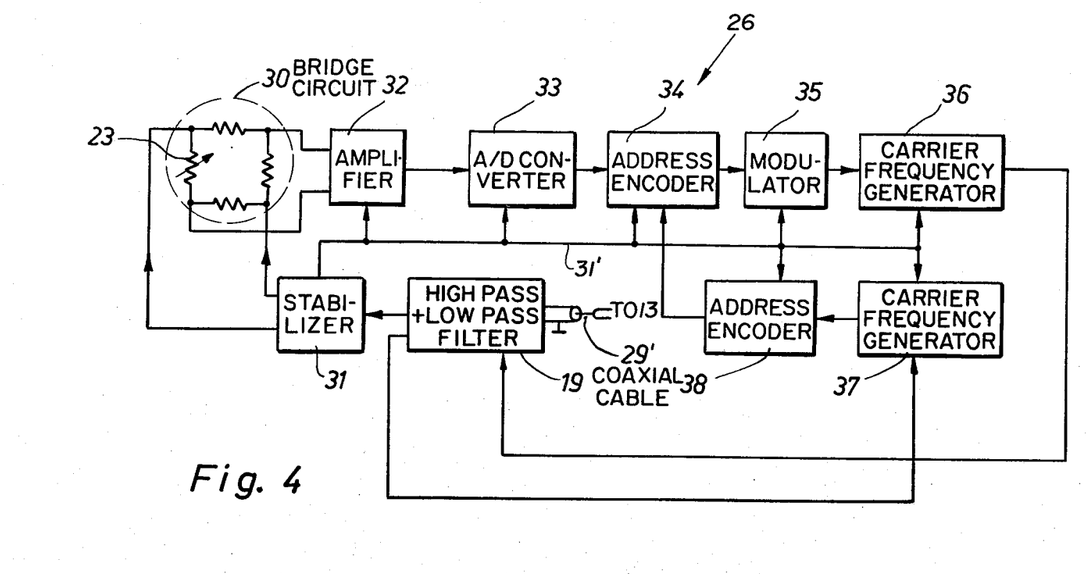
FIG. 4 is a block circuit diagram of the electronic circuit arrangement of the weight sensor or load cell according to FIG. 3.

FIGS. 3 and 4 illustrate an example embodiment of the weight sensors 5 and the respective circuit arrangement for such weight sensors as are used, for example, in FIG. 2. Each weight sensor comprises mainly a lower housing member 21 and a cover member 22 operatively secured to a platform 2' through threaded bolts 39. The platform 2' may be installed next to the freight loading door 9 or next to a passenger entrance door and will perform the same function in both instances. The load cell or pressure sensor 5 further comprise a pressure sensitive synthetic material conductor 23 operatively interposed between two metal plates 24 and two insulating plates 25 and electrically connected with its output terminals to electronic circuit means 26, such as an amplifier, by conductors 27. The lower housing member 21 is, for example, secured to the floor of the freight compartment, for example, by screws 28. The ball bearing mat 2 may be directly connected to the cover 22 of the pressure sensor 5, whereby the ball bearing mat 2 would take the place of the platform 2'. However, the ball bearing mat 2 may also rest on the platform 2'. Where the weighing device is installed adjacent to the entrance door of a passenger compartment, the platform 2' may form a door threshold which in turn may be covered by a floor mat or the like.

The cover 22 in any type of installation of the sensors 5 is movable in the "z" direction as indicated in FIG. 3, namely, vertically up and down relative to the lower housing member 21 whereby the synthetic material conductor 23 is exposed to the load exerted by a weight effective through the metal plates 24 and the insulating plates 25. The synthetic conductor material has such a characteristic that its electric conductance increases proportionally to the weight placed on the platform 2' or on the ball bearing mat 2, whereby a weight representing electrical signal is provided at the output terminal 29 which may be a coaxial cable plug secured to a housing wall 25' of the lower housing member 21.

FIG. 4 illustrates a circuit arrangement for processing the output signal of the weight sensors 5, whereby the synthetic material conductor 23 forms part of a bridge circuit 13, the output signal of which is supplied through an amplifier 32 to an analog-to-digital converter 33. The components shown in FIG. 4 may be integrated into the circuit 26 shown in block form in FIG. 3. The weight representing digital signal at the output of the A/D converter 33 is supplied to an input encoder 34 which adds to the particular weight representing signal a code word or flag which correlates the weight signal to the particular weight sensor. The code word or flag is a further digital signal and the complete signal comprising the weight information as well as the identification of the weight sensor is supplied to a modulator 35 only when the encoder 34 has received a release signal provided by an address decoder 38. The modulator 35 in turn is connected to a carrier frequency generator 36 which generates a carrier wave modulated by the above mentioned signals. The output of the carrier frequency generator 36 is connected to the high pass and low pass filter means 19 shown in FIG. 2 and the output of such filter means 19 is connected through a coaxial cable 29' to the control logic circuit 13 as shown in FIG. 2. The carrier wave passes through the high frequency filter portion of the filter means 19. The logic circuit 13 stores the received information for the various operations to be performed by the logic circuit 13 as will be described in more detail below. Referring further to FIG. 3 the weight sensor 23 supplies the measured value signal only then to the coaxial cable 29' when the sensor 23 has received an addressing or interrogating signal from the circuit 13. This interrogating signal is also a digital signal and is supplied by way of a correspondingly modulated carrier wave through the coaxial cable conductor 29' and the high pass portion of the filter means 19 to a carrier frequency receiver 37 which supplies the received interrogating signal to an address decoder 38. The address decoder 38 compares the address information forming part of the interrogating signal with the address of the particular pressure sensor. If the two addresses correspond, the address detector 38 supplies a respective release or gating signal to the address encoder 34 which thus supplies the weight and adress signal to the modulator 35. Thus, the signal passes through the circuit in the just described manner to the coaxial cable 29' and to the logic circuit 13.

The weight sensor electronic circuit 26 as just described is supplied through the coaxial cable 29 with a d.c. voltage passing through the low pass portion of the filter means 19 to a stabilizer circuit 31 which produces a sufficiently stable operating voltage for the bridge circuit 30 as well as for all active components of the circuit arrangement shown in FIG. 4. For this purpose an output 31' is connected to each of the active components of FIG. 4.

Figure 5:
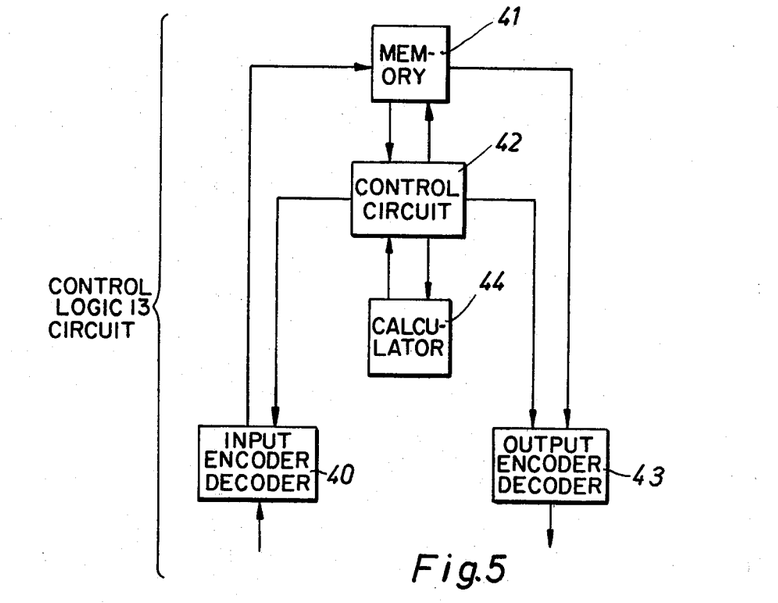
FIG. 5 illustrates in block form the components of the control logic circuit of FIG. 2.

FIG. 5 shows a block diagram of the control logic circuit 13 of FIG. 2. The logic control circuit 13 comprises an input encoder and decoder 40 connected with its output to a memory 41 which in turn is connected to an output encoder and decoder 43 as well as to a distributor circuit 42 which is also connected to said input and output encoder/decoder circuit 40 and 43 as well as to a calculator 44. The distributor circuit 42 is actually a control unit which controls the information flow of the entire system by sending interrogation signals in a predetermined sequence through the input encoder/decoder 40 to the individual input components of the system such as the weight sensors 5, the operating switching 8, the main input control panel 14, and the position report element 20. The sequence control provides a sufficient time space between adjacent interrogation signals during which the response signals may be processed through the input encoder/decoder 40 in the control circuit 42, whereupon the logic results of such signal processing or rather the measured values are supplied to the output encoder/decoder 43 which in turn supplies the signals to the motor control 16, the automatic lashing devices 17, and the indicator unit 15.

The main purpose of the memory 41 is to store the information regarding the pallet or container weights, regarding the operated actuating switches 8 and regarding the type of operation supplied through the main input control panel 14. The weight, for example, must be ascertained for any particular container from six individual weight sensors 5 located under the ball bearing mat 2. The individual weight components are then added to provide the weight information for each individual container or pallet. The control circuit 42 controls the logic sequence of the calculating operations. The calculator 44 performs the calculating operations in accordance with the sequence instructions from the control circuit 42. This calculation involves the adding of the partial weight components to ascertain the weight of a container or pallet and also the addition of the container or pallet weights to obtain the total weight. Further, the calculator 44 may compare the added up weight values with predetermined maximum values in order to provide a warning signal when such maximum values are exceeded, either for any particular weight position 7 or for the total weight.

Figure 6:
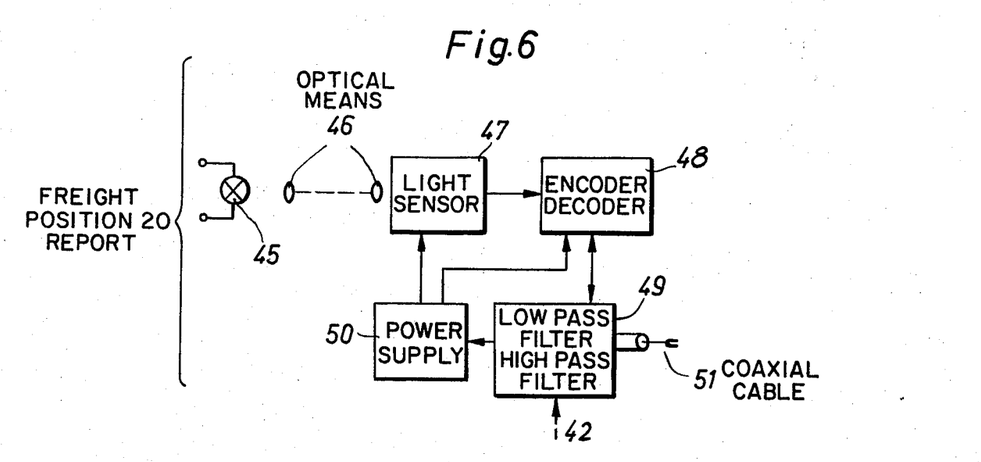
FIG. 6 is a block circuit diagram of the components forming a light barrier for the freight position report means of FIG. 2.

FIG. 6 shows a block circuit diagram of a freight position report unit 20 also shown in FIG. 2 and comprising a light source 45, optical means 46, and a light sensitive member 47 such as a photocell, the output of which is connected to an encoder/decoder 48 which in turn is connected with its output to a low pass filter and high pass filter 49. A power supply 50 energizes the light sensor 47 as well as the encoder/decoder 48. The light source 45, optical means 46 and the photocell 47 constitute a light barrier which is interrupted when a container or the like is placed in position in any one of the respective freight positions or stalls 7. The signal resulting from the interruption of the light barrier is provided at the output of the encoder/decoder 48 and is interrogated by the control circuit 42 through the filter means 49. The encoder/decoder designates the respective freight position 7a, 7b and so forth. The low pass filter portion of the filter means 49 pass the operating voltage coming through the coaxial cable 51 to the power supply 50 which acts as a stabilizing member providing a stabilized operating voltage to the electronic components 47, 48. Rather than interrupting a light barrier, it is also possible to reflect a light signal when a container or the like occupies a freight position 7a, 7b, and so forth. The operation would be the same.

Figure 7:
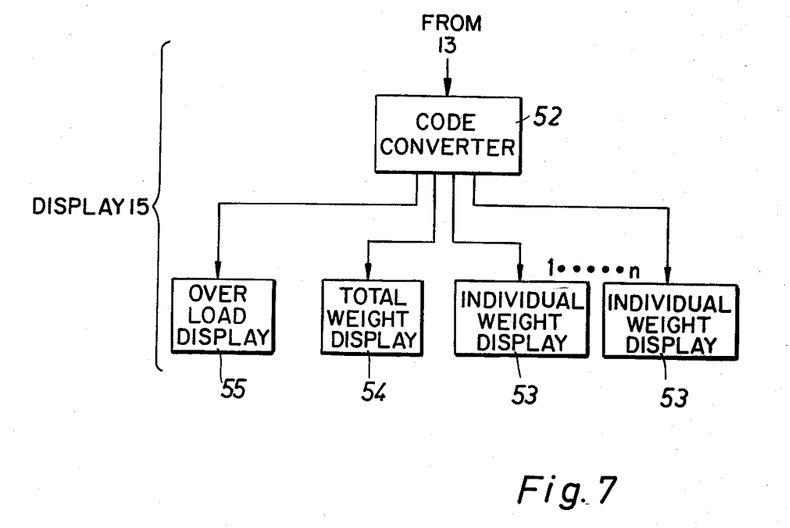
FIG. 7 is a more detailed block circuit diagram of the display means of FIG. 2.

FIG. 7 illustrates in block form further details of the display unit 15 shown in FIG. 2. The display unit 15 comprises a display field 53 for each freight position or stall 7a, 7b and so forth. Thus, the display field shows the weight of the freight in each occupied freight position. The control logic circuit 13 provides the correlation of the weight information and the respective freight position. The display unit 15 further comprises a display field 54 for the total weight and an overload indicator 55 which may provide an optical and/or acoustical overloading warning signal. Thus, it is possible according to the invention to avoid overloading the floor structure of the freight compartment in an aircraft by more evenly distributing the freight containers rather than bunching many heavy containers in one area.

The just described indicator or display fields 53, 54, and 55 receive their control signals through a code converter 52 which in turn is connected to the control logic circuit 13. The individual display fields, preferably comprise light emitting diode components each having seven elements. The code converter 52 has two purposes. First, it correlates the signals coming from the control logic circuit 13 to the individual display fields in accordance with the corresponding addresses. Further, the code converter 52 processes the digital signals into a form suitable for display. The individual fields 53 are arranged in such a manner as to represent a floor plan of the freight space, whereby each individual display field 53 symbolizes the corresponding freight location or stall 7a, 7b, and so forth. The correlation of the weight values to the individual freight locations is accomplished by the control logic circuit 13 in accordance with the loading program as described above. Instead of the digital display of the weights, it is also possible to provide an analog display as is known in the art. The analog display could be combined with a fixed maximum value display whereby the approximation of the measured value relative to the predetermined maximum value could be shown in an especially graphic manner.

The above described system is also suitable for the ascertaining of the passenger weight, whereby the platform 2' would be installed, as mentioned, as a passenger door threshold. Again, the individual weight representing signals would be supplied to the control logic circuit 13 which would be adapted to handle the maximum number of individual weight components according to the number of passengers permitted for any particular type of airplane. In this system the hand luggage would also be subject to weighing and the total weight would also be added up by a calculator for display on a display field conveniently positioned for evaluation by the pilot, for example.

It would also be possible to arrange the weight sensors in each individual passenger seat. Due to the above described digital interrogation of the various weight sensors, it is possible to contact all weight sensors in parallel so that each seat requires merely a simple coaxial plug.

The present system may also be used for calculating or ascertaining the center of gravity of the aircraft on the basis of the weight values ascertained by the individual weight sensors. Additional data may be supplied through the main control panel 14. Such additional data would relate to the center of gravity of the empty aircraft and to information regarding the fuel content of the various fuel containers. Again, the display could be provided in such a position as to conveniently supply the information to the flight personnel.

Figure 8:
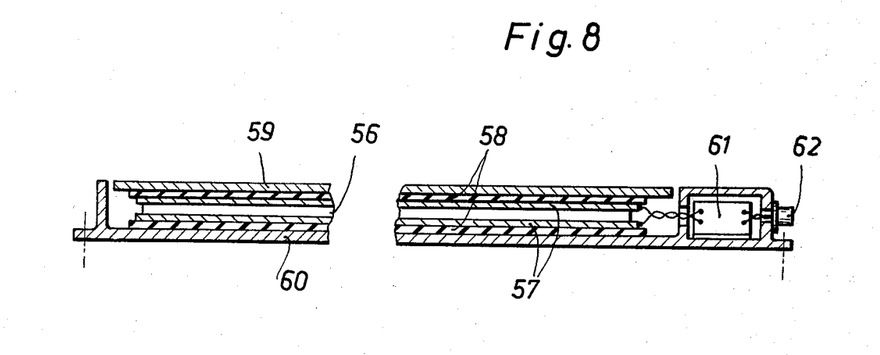
FIG. 8 is a sectional view similar to that of FIG. 3, however, showing a pressure sensor useful as a control button.

FIG. 8 illustrates a possible embodiment for the control switches 8 shown in FIGS. 1 and 2. A pressure sensitive synthetic material conductor 56 is operatively positioned between two metal plates 57 and two insulating plates 58 in a housing 60 covered by a cover plate 59. The housing 60 includes a compartment in which the electronic circuit components 61 are arranged to receive the signal caused by pressure on the cover plate 59. The output of the electronic circuit 61 is connected to a coaxial plug 62. Thus, the structure of these switches is similar to that of the weight sensors described above with reference to FIG. 3. The sensor electronic circuit 61 is constructed in the same manner as described above with reference to FIG. 4. As in FIG. 4, the synthetic material conductor 56 forms part of a bridge circuit, the analog output signal of which is supplied to an analog-to-digital converter providing a digital signal corresponding to the finger pressure exerted by an operator on the plate 59. Thus, the control signal supplied to the logic circuit 13 is proportional to the pressure and the control signal supplied in turn to the motor control 16 is also pressure proportional, whereby the motors 3', 4' may be operated with an r.p.m. which is proportional to the finger pressure of the operator. Any conventional proportional control means for electric motors may be used for the present purpose. Due to the proportional control it is possible to adapt the loading and unloading to the instantaneously prevailing conditions, whereby the maximum r.p.m. would be above the fixed r.p.m. which was customary heretofore. This feature of the invention has the advantage that it helps reducing the danger of accidents because the operator has now control over the travelling speed of the freight containers or pallets and if the conditions permit, he may increase the loading speed. Another advantage of the control sensors illustrated in FIG. 8 is seen in that they may be constructed in an elongated strip form thereby facilitating their reachability as well as their operability.

The described transmission of the signals throughout the entire system by means of a digital interrogation and the simultaneous transmission of the power supply through the same conductor is also possible without the use of a carrier freqency. Thus, the digital signals may be superimposed on the supply voltage. The filter means for such superposition and the subsequent separation of the information carrying signals from the supply voltage are well known in the art.

Further advantages of the invention are seen in that the installation of the system in the aircraft itself makes the flight planning independent of the availability of scale equipment on the ground. Another advantage is seen in the fact that the individual and total weights may be ascertained with high accuracy and so may the determination of the center of gravity of the loaded aircraft. Further, the present system itself has a negligibly small weight which is particularly due to the fact that the electrical wiring for the present system may be minimized by utilizing the wiring for multiple purposes. As mentioned, the construction of the operating switches as shown in FIG. 8 simplifies the operation of the system and reduces accidents.

Figure 9:
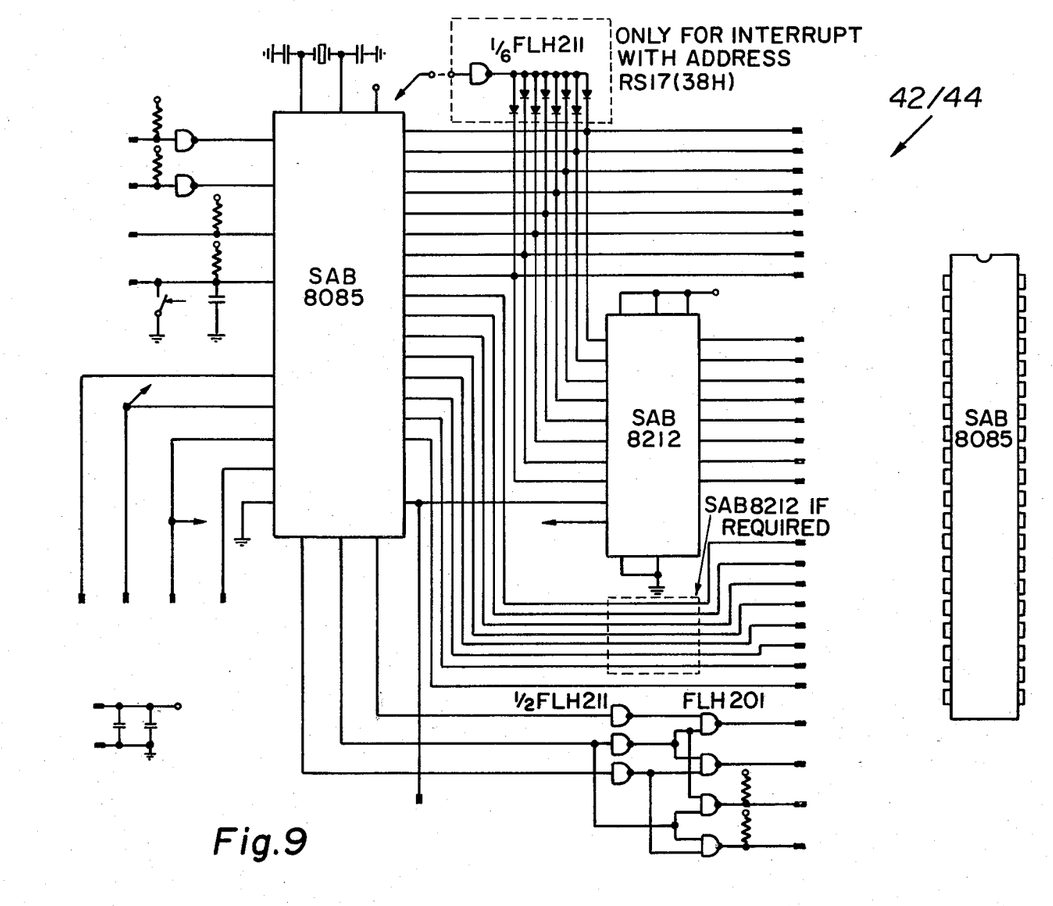
FIG. 9 shows a circuit diagram illustrating further details of the block diagram of FIG. 5.

FIG. 9 shows a possible embodiment of the control logic circuit 13. According to FIG. 5 this circuit 13 comprises the memory 41, the control circuit 42, the calculator 44, as well as the encoders/decoders 40 and 43 at the input or output, respectively. So far as the internal circuit is concerned, the control circuit 42 and the calculator 44 are identical. The circuit of FIG. 9 is based upon the microprocessor module SAB 8085 and the eight bit input/output module SAB 8212, both produced by SIEMENS AG, Munich, Germany. The module SAB 8085, apart from the pure calculating logic, is also provided with means for the generation of the clock pulse. These means comprise a quartz-controlled clock generator as well as a driver stage and a system control and bus driver module for the data bus. The encoders/decoders 40 and 43 may be dispensed with when the coding employed within the control logic circuit is identical with the coding employed within the entire system. A possible embodiment of the encoders/decoders 40 and 43 is exemplified in the following.

Figure 11:
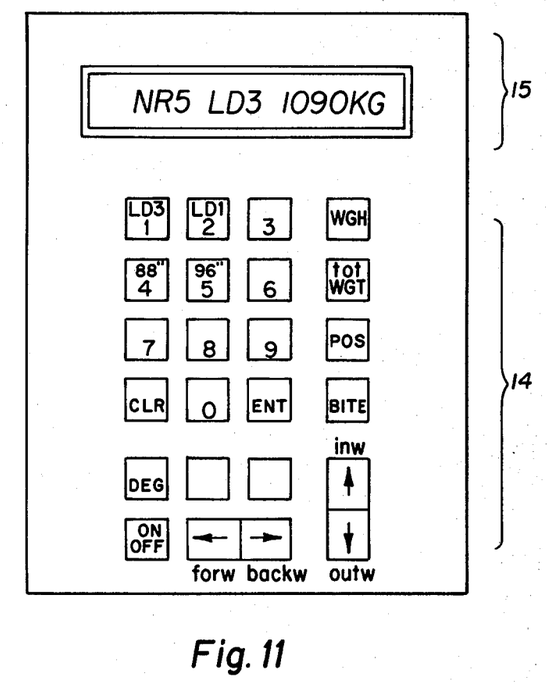
FIG. 11 illustrates the arrangement of an indicator and control panel also shown in block form in FIG. 2.

FIG. 11 shows the main control panel 14 including a keyboard corresponding to the input and output functions. The keyboard used here operates e.g. on the basis of the ASC II coding. This is a conventional telegram code. Such keyboards are commonly known and are, by way of example, also produced by DATAMEGA, Germany.

Figure 10:
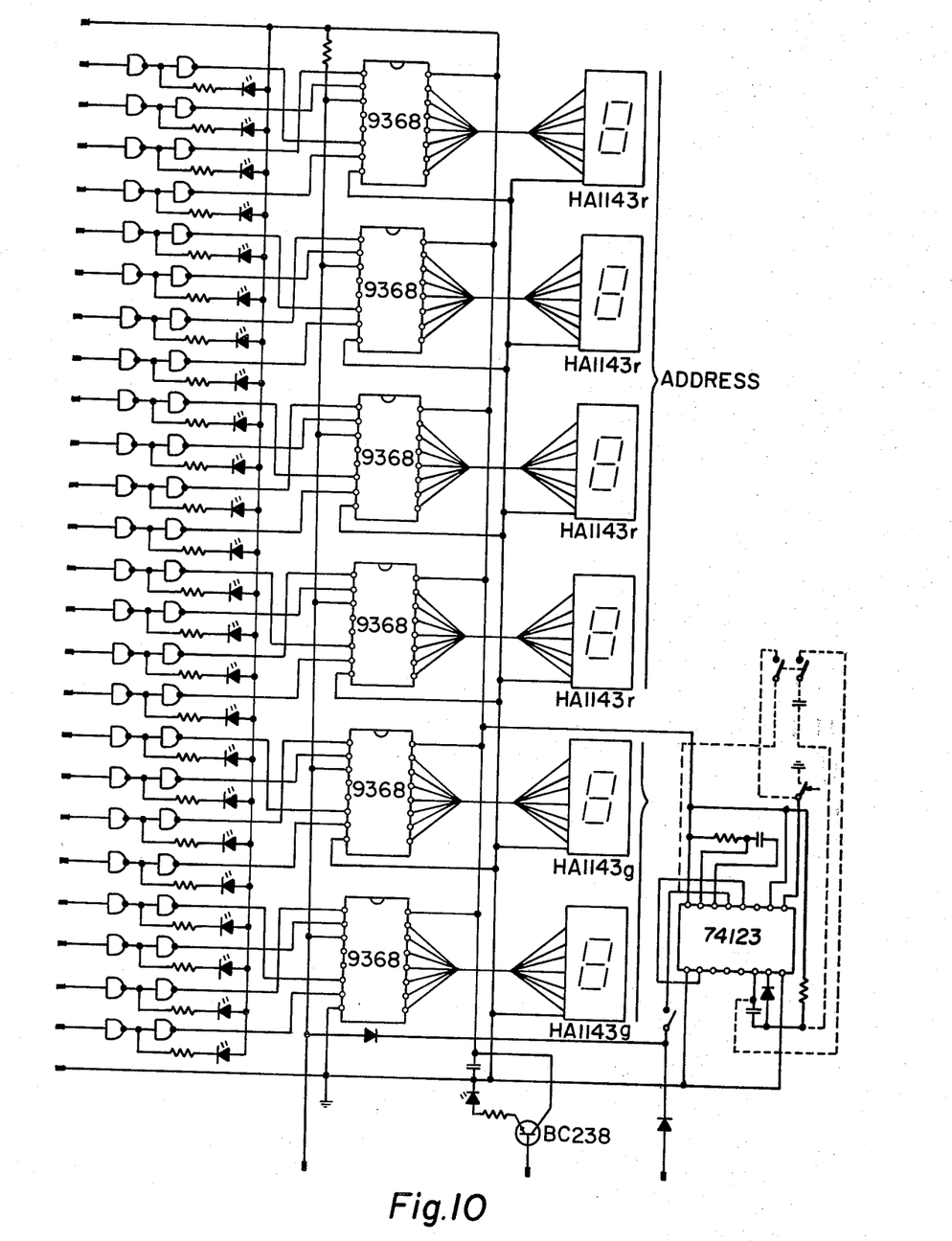
FIG. 10 is a circuit diagram of a display unit, that may be used for the present purposes.

The block circuit of the indicator device 15 is illustrated in FIG. 7 and further details are shown in FIG. 10. According to FIG. 7 the indicator unit comprises essentially the code converter 52 and the weight displays 53 to 55. The displays are formed, for instance, by 7-element light diode modules HA 1143, manufactured by said SIEMENS AG. By way of example, the module 9368, likewise produced by SIEMENS AG, may be employed as code converter 52.

The motor control 16 shown in FIG. 2 is based upon the employment of controllable semiconductors, e.g., thyristors supplying the motor with drive energy in the form of pulses having a constant frequency and a variable pulse duration. The set pulse duration then determines the number of revolutions of the motor. Motor controls of this kind are known in the art.

The pressure sensitive plastics conductors 23 in FIG. 3 and 56 in FIG. 8 does, by way of example, comprise the material "DYNACON", produced by DYNOCON INDUSTRIES, Leona, N.J., U.S.A. The electrical conductivity of this material changes within a wide range in linear dependence of a compressive force exerted thereupon.

Figure 12:
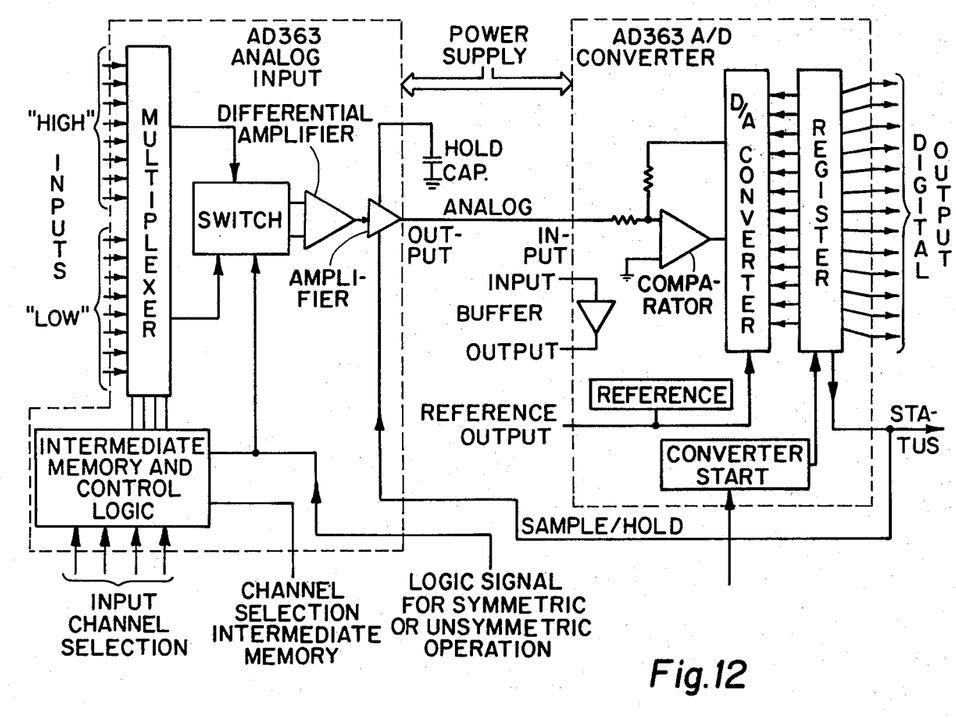
FIG. 12 shows an example of a suitable, conventional analog-to-digital converter.
Figure 13:
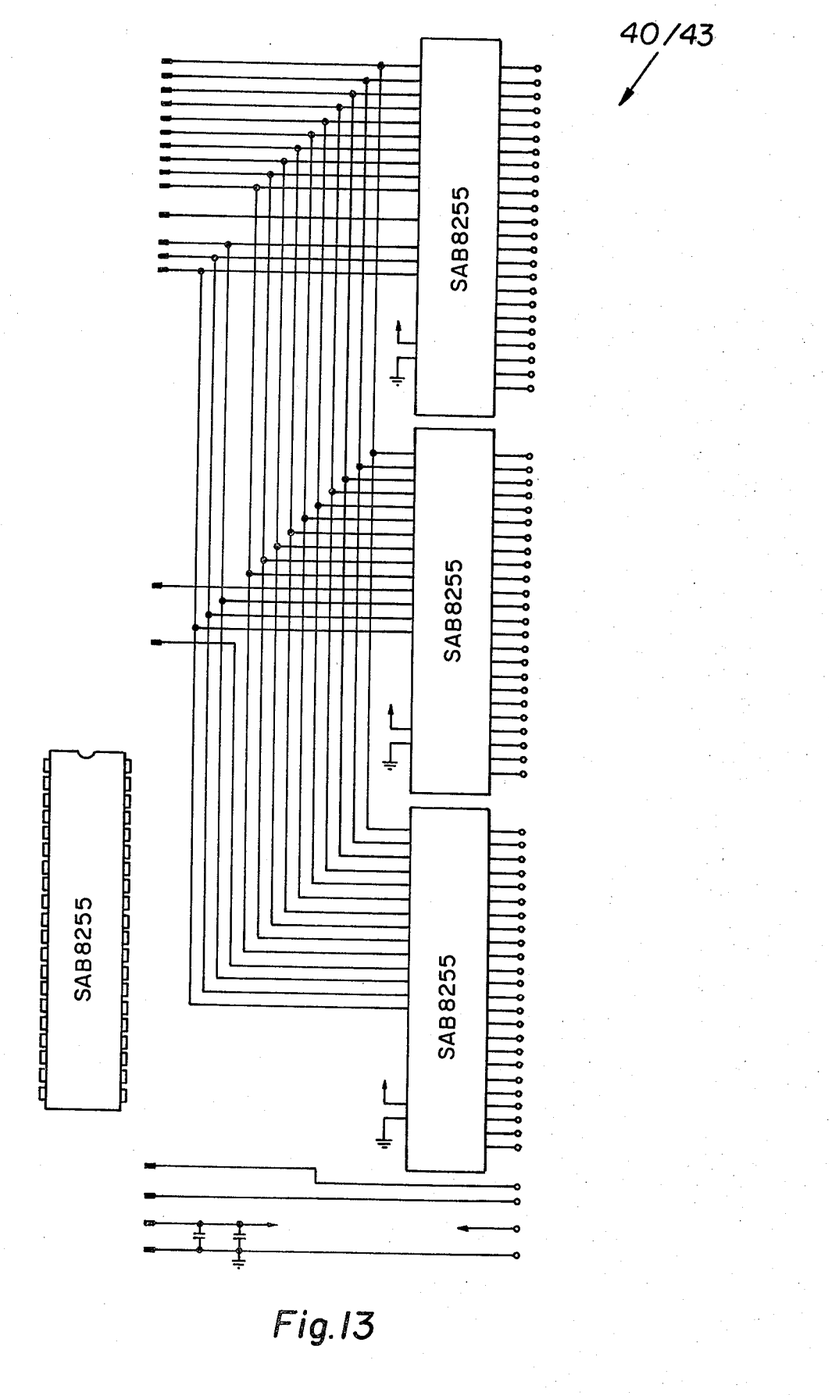
FIG. 13 shows the wiring of an encoder decoder circuit also shown in block form in FIG. 5.

The electronic sensor means 26, 61 as shown, for example, are modular elements well known in electronic engineering. It is the principal object of this circuit to convert the analog signal coming from the bridge circuit into a digital signal. This operation is carried out by the A/D converter 33 which may, for instance, be embodied by the module AD 363 produced by ANALOG DEVICES. This module supplies a 12 bit output signal and is shown in FIG. 12. FIG. 13 illustrates an input or output encoder/decoder. It is possible, by way of example, to construct these circuits by the appropriate interconnection of several SAB 8255 modules, produced by SIEMENS AG. The encoding and decoding processes are carried out by this circuit. The input or output routes are separated within this circuit.

Figure 14:
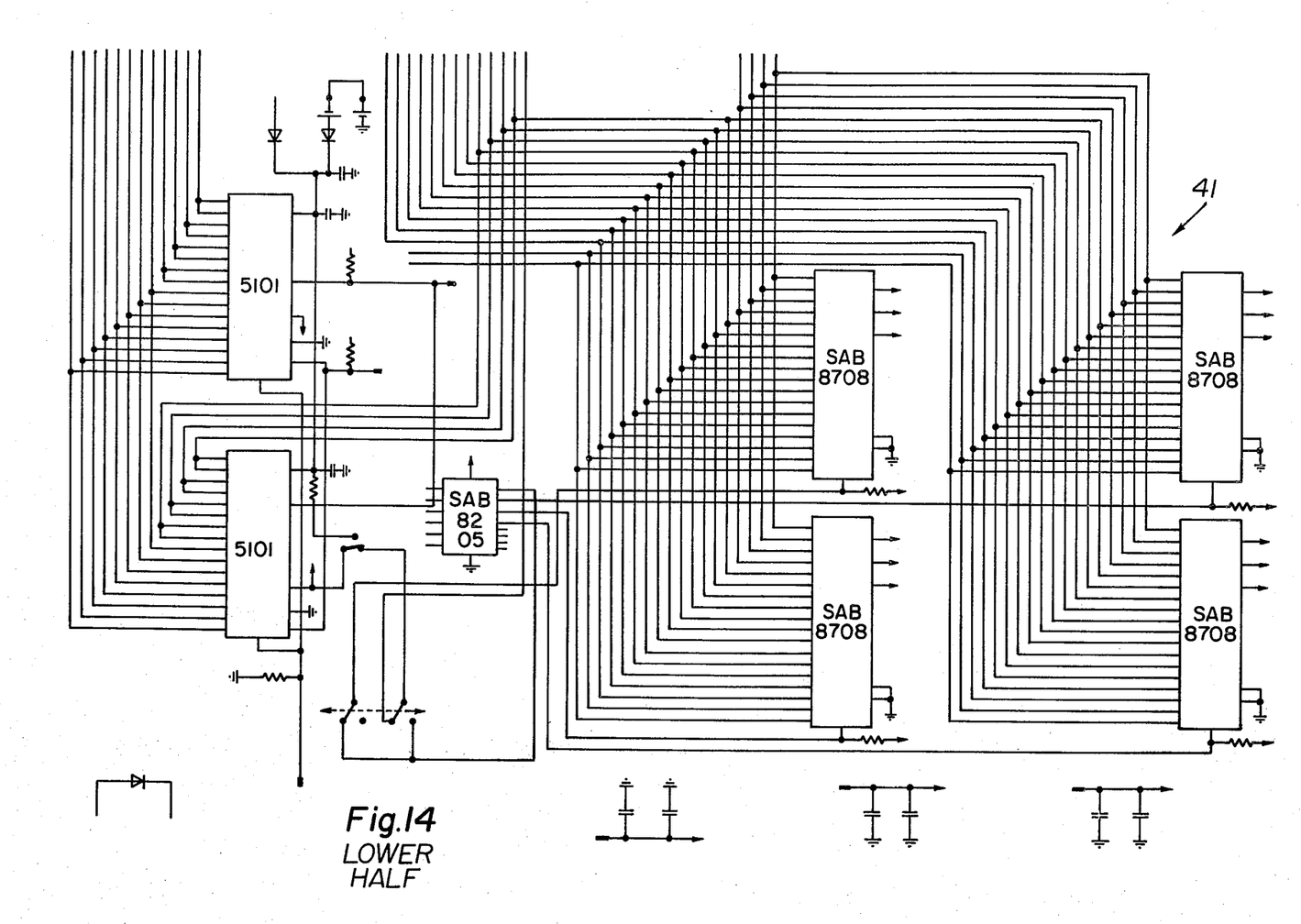
FIG. 14 shows the wiring of a memory circuit shown in block form in FIG. 5.

FIG. 14 shows the wiring diagram of the memory 41 provided in the control logic circuit 13. The memory 41 may, by way of example, be constructed of the following modules produced by SIEMENS AG:

SAB 8708 REPROM modules;
SAB 8111 RAM modules and
5101 CMOS-RAM modules.

The REPROM modules serve, in this case, for the reception of the preset calculating program, e.g., for the weight determination, whereas the RAM modules serve as data memory.

Although the invention has been described with reference to specific example embodiments, it is to be understood, that it is intended to cover all modifications and equivalents within the scope of the appended claims.

What is claimed is:

1. An apparatus for loading and unloading an aircraft and for ascertaining the weight of the load, comprising weighing station means arranged within the aircraft fuselage in such position that the weight of any item of payload to be added to the actual weight of the aircraft must operatively and individually pass said weighing station means for individually measuring the weight of each payload item entering the aircraft, load cell means in said weighing station means to provide individual weight representing electrical signals, electronic logic circuit means, and conductor means operatively connecting said electronic logic circuit means to said load cell means for producing from said individual weight representing electrical signals respective control signals.

2. The apparatus of claim 1, further comprising lashing means (17) for securing a weight in a fixed position in the aircraft, and circuit means operatively connecting said lashing means to said electronic, logic circuit means for automatically securing said lashing means when a weight is placed in proper position relative to said lashing means.

3. The apparatus of claim 1 or 2, further comprising weight position reporting means (20) operatively connected to said electronic, logic circuit means for supplying a position signal to said electronic, logic circuit for signifying the placing of a weight in a proper location relative to said weight position reporting means.

4. The apparatus of claim 3, wherein said weight position reporting means (20) comprise light source means (45), light sensing means (47), and optical means operatively arranged to supply the light from said light source means to said light sensing means to form a light barrier which provides said position signal when a weight is placed in proper position.

5. The apparatus of claim 1, further comprising indicator means (15) comprising a plurality of display positions (53) corresponding to respective load receiving positions in the aircraft, means operatively connecting said indicator means to said electronic, logic circuit means whereby the weight of a load item placed in said load receiving position is displayed in the corresponding display position (53).

6. The apparatus of claim 5, wherein said indicator means further comprise total weight display means (54) and overload warning display means (53).

7. The apparatus of claim 1, wherein said weighing station means is arranged for weighing passengers.

8. The apparatus of claim 7, further comprising door threshold means, said weighing station means being incorporated into said door threshold means for weighing passengers.

9. The apparatus of claim 7, further comprising passenger seat means, said weighing station means being arranged for cooperation with said passenger seat means for weighing passengers.

10. The apparatus of claim 1, further comprising data input keyboard means operatively connected to said electronic, logic circuit means for supplying information data to said electronic, logic circuit means to determine the center of gravity for the aircraft in accordance with the weight ascertained from said loading.

11. The apparatus of claim 1, further comprising control input keyboard means and freight container transport means including drive means for said transport means, means operatively connecting said control input keyboard means to said drive means for operating the latter.

12. The apparatus of claim 11, wherein said control input keyboard means comprise pressure sensitive control keys including synthetic material elements having a pressure dependent electric conductance.

13. The apparatus of claim 1, wherein said conductor means comprise cable means capable of simultaneously constituting power supply means and digital signal transmitting means.

14. The apparatus of claim 13, wherein said conductor means comprise simple coaxial cable means suitable for signal transmission by carrier frequency techniques.

* * * * *